US012196149B2

(12) United States Patent
Ishii et al.

(10) Patent No.: US 12,196,149 B2
(45) Date of Patent: Jan. 14, 2025

(54) CONTROL DEVICE

(71) Applicant: ISUZU MOTORS LIMITED, Tokyo (JP)

(72) Inventors: Daiki Ishii, Fujisawa (JP); Yoshihiro Meshimoto, Fujisawa (JP); Tatsuya Tanaka, Fujisawa (JP); Kentaro Morioka, Fujisawa (JP); Yorimasa Tsubota, Fujisawa (JP); Takuro Mita, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/698,394

(22) PCT Filed: Aug. 8, 2022

(86) PCT No.: PCT/JP2022/030239
§ 371 (c)(1),
(2) Date: Apr. 4, 2024

(87) PCT Pub. No.: WO2023/062921
PCT Pub. Date: Apr. 20, 2023

(65) Prior Publication Data

US 2024/0401542 A1 Dec. 5, 2024

(30) Foreign Application Priority Data

Oct. 12, 2021 (JP) ................................. 2021-167670

(51) Int. Cl.
*F02D 41/40* (2006.01)
*F02D 35/02* (2006.01)
*F02D 41/38* (2006.01)

(52) U.S. Cl.
CPC ......... *F02D 41/401* (2013.01); *F02D 35/026* (2013.01); *F02D 2041/389* (2013.01); *F02D 2200/021* (2013.01)

(58) Field of Classification Search
CPC ...... F02D 35/026; F02D 41/22; F02D 41/401; F02D 2041/389; F02D 2200/021; F02D 2200/022
See application file for complete search history.

(56) References Cited

U.S. PATENT DOCUMENTS 9,816,454 B1 * 11/2017 Anderson ............ F02D 41/402
2005/0229903 A1 10/2005 Kobayashi
(Continued)

FOREIGN PATENT DOCUMENTS

JP S60-162034 A 8/1985
JP 2000-186598 A 7/2000
(Continued)

OTHER PUBLICATIONS

International Search Report of PCT/JP2022/030239 dated Oct. 11, 2022 .

*Primary Examiner* — John M Zaleskas
(74) *Attorney, Agent, or Firm* — Shih IP Law Group, PLLC

(57) ABSTRACT

A control device comprises: a temperature estimating unit for estimating the temperature of a piston of an internal combustion engine of a vehicle; and a control unit which, if the temperature of the piston estimated by the temperature estimating unit has risen to a first threshold corresponding to a heat resisting temperature of the piston, reduces an upper limit value of a fuel injection timing at which a fuel injector for injecting fuel onto the piston injects the fuel, and which increases the upper limit value of the fuel injection timing at
(Continued)

a higher temperature than the first threshold when the rise in temperature of the piston stops.

12 Claims, 4 Drawing Sheets

(56) References Cited

U.S. PATENT DOCUMENTS

| | | | | |
|---|---|---|---|---|
| 2010/0292909 | A1 * | 11/2010 | Gwidt | F02D 41/401 701/103 |
| 2011/0307164 | A1 * | 12/2011 | Arihara | F02D 41/047 701/105 |
| 2014/0074381 | A1 * | 3/2014 | Sczomak | F02D 41/402 701/105 |
| 2016/0084192 | A1 * | 3/2016 | Levy | F02D 41/0002 123/445 |
| 2017/0342925 | A1 * | 11/2017 | Yoshimura | F02D 41/40 |
| 2017/0363039 | A1 * | 12/2017 | Shibata | F01M 1/16 |
| 2018/0080400 | A1 * | 3/2018 | Imaoka | F02D 41/345 |
| 2018/0171926 | A1 * | 6/2018 | Kodama | F02B 3/02 |
| 2019/0063343 | A1 * | 2/2019 | Eser | F02D 41/40 |
| 2020/0025116 | A1 * | 1/2020 | Hanamura | F02D 41/401 |

FOREIGN PATENT DOCUMENTS

| | | | | | |
|---|---|---|---|---|---|
| JP | 2005-248703 | A | | 9/2005 | |
| JP | 2009-103106 | A | | 5/2009 | |
| JP | 2014137025 | A | * | 7/2014 | |
| JP | 2015086762 | A | * | 5/2015 | |
| JP | 2016102471 | A | * | 6/2016 | |
| JP | 2017186965 | A | * | 10/2017 | |
| JP | 2018-076778 | A | | 5/2018 | |
| WO | WO-2013141089 | A1 | * | 9/2013 | F02D 15/02 |
| WO | WO-2018084276 | A1 | * | 5/2018 | F02D 41/22 |
| WO | WO-2019069443 | A1 | * | 4/2019 | |

* cited by examiner

CONTROL DEVICE

CROSS-REFERENCE TO RELATED APPLICATIONS

The present application is a U.S. National Stage entry of PCT Application number PCT/JP2022/030239, filed on Aug. 8, 2022, which claims priority under 35 U.S.C. § 119 (a) to Japanese Patent Application No. 2021-167670, filed on Oct. 12, 2021, contents of which are incorporated herein by reference in their entirety.

TECHNICAL FIELD

The present disclosure relates to a control device for controlling an internal combustion engine of a vehicle.

BACKGROUND OF THE INVENTION

There has been known a conventional technology for controlling a timing of injecting fuel to prevent a piston of an internal combustion engine of a vehicle from overheating (for example, see Patent Document 1).

PRIOR ART

Patent Document

Patent Document 1: Japanese Unexamined Patent Application Publication No. 2018-76778

BRIEF DESCRIPTION OF THE INVENTION

Problem to be Solved by the Invention

The conventional technology has a problem that, by controlling timing of fuel injection, the temperature of a piston decreases but the temperature of exhaust gas tends to rise.

The present disclosure focuses on this point, and an object thereof is to prevent a piston from overheating and prevent the temperature of exhaust gas from rising too high.

Means for Solving the Problem

A control device of the present disclosure includes a temperature estimation part that estimates a temperature of a piston of an internal combustion engine on the basis of at least any of a temperature of cooling oil for cooling the piston of the internal combustion engine of a vehicle, a temperature of cooling water for cooling the internal combustion engine, or an intake air temperature of the internal combustion engine, and a control part that i) reduces an upper limit value of a timing of fuel injection, at which a fuel injection part that injects fuel into the piston injects the fuel, when the temperature of the piston estimated by the temperature estimation part rises to a first threshold value corresponding to a heat-resistance temperature of the piston and ii) increases an upper limit value of the timing of fuel injection, at a temperature higher than the first threshold value, when the temperature of the piston stops rising.

The control part may increase a rate of change of the upper limit value during an increase in the upper limit value of the timing of fuel injection, compared to a rate of change of the upper limit value during a reduction in the upper limit value of the timing of fuel injection.

The control part may determine an amount of reduction in the upper limit value on the basis of a rising rate of the temperature of the piston estimated by the temperature estimation part. The control part may increase an amount of reduction in the upper limit value as the rising rate is greater. The control part may increase a rate of change of reduction of the upper limit value as the rising rate is greater. The control part may determine a reduction speed of the upper limit value on the basis of a rising rate of the temperature of the piston estimated by the temperature estimation part.

The control part may reduce the upper limit value of the amount of fuel to be injected when the temperature of the piston estimated by the temperature estimation part rises to a second threshold value greater than the first threshold value, after reducing the upper limit value of the timing of fuel injection.

The control part may reduce the upper limit value of the amount of fuel to be injected by reducing the upper limit value of the output torque of the vehicle when the temperature of the piston rises to the second threshold value. The control part may reduce the upper limit value by referring to control data that associates a target value of the output torque and an amount of fuel to be injected, the control data being used for reducing a target value of the output torque of the vehicle.

The control part may reduce an upper limit value of the output torque of the vehicle when the temperature of the piston rises to the first threshold value.

The temperature estimation part may estimate the temperature of the piston on the basis of at least any of the temperature of the cooling water or the temperature of the intake air if the temperature of the cooling oil cannot be detected. The control part may increase the upper limit value to an advance side after a period of time determined on the basis of a magnitude of an error in the temperature of the piston estimated by the temperature estimation part has elapsed after the temperature of the piston estimated by the temperature estimation part stops rising.

Effect of the Invention

According to the present invention, it is possible to prevent a piston from overheating and to prevent the temperature of exhaust gas from rising too high.

DESCRIPTION OF EMBODIMENTS

[Configuration of Vehicle S]

Figure 1:
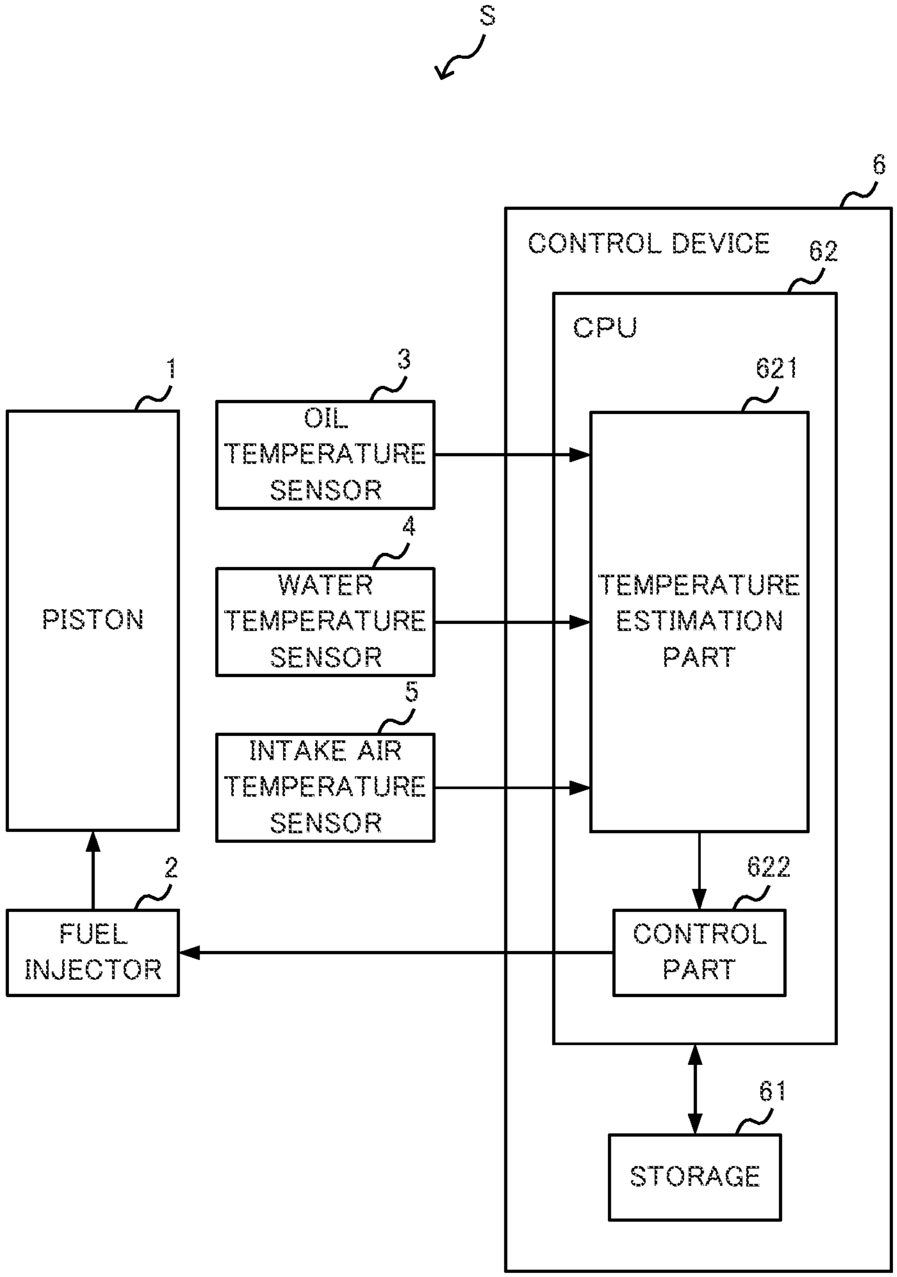
FIG. 1 shows a configuration of a control system of an engine as an internal combustion engine in a vehicle S.

FIG. 1 shows a configuration of a control system of an engine as an internal combustion engine in a vehicle S according to the present embodiment. The vehicle S may be any type of vehicle, and is a commercial vehicle having a diesel engine as an internal combustion engine, for example. The vehicle S includes a piston 1, a fuel injector 2, an oil temperature sensor 3, a water temperature sensor 4, an intake air temperature sensor 5, and a control device 6. The control device 6 includes a storage 61 and a Central Processing Unit (CPU) 62. The CPU 62 functions as a temperature estimation part 621 and a control part 622.

The piston 1 is accommodated in a cylinder of the engine. Fuel is injected into the piston 1 from the fuel injector 2, and the engine generates power for driving the vehicle S by burning injected fuel.

The fuel injector 2 is a fuel injection part that injects fuel into the piston 1 under a control of the control part 622. The fuel injector 2 injects an amount of fuel determined by the control part 622 into the piston 1 at a timing of injection determined by the control part 622. The timing of injection is represented by an angle of a gear connected to the piston 1. The angle of the gear is represented with reference to an angle of the gear at the top dead center of the piston 1. In the present specification, an act of advancing a timing of fuel injection is sometimes referred to as "advancement," while an act of retarding a timing of fuel injection is sometimes referred to as "retardment."

The oil temperature sensor 3 detects the temperature of oil used for cooling and lubricating the engine. The water temperature sensor 4 detects the temperature of cooling water of the engine. The intake air temperature sensor 5 detects the temperature of intake air. The oil temperature sensor 3, the water temperature sensor 4, and the intake air temperature sensor 5 inform the temperature estimation part 621 of data indicating a detected temperature.

The control device 6 is a device for controlling each part of the engine, and is an Engine Control Unit (ECU), for example. The storage 61 includes a storage medium such as a Read Only Memory (ROM) and a Random Access Memory (RAM), and stores a program executed by the CPU 62. Further, the storage 61 stores various types of data used by the CPU 62 to control the engine. As an example, the storage 61 stores a temperature calculation table that associates a temperature detected by at least any of the oil temperature sensor 3, the water temperature sensor 4, or the intake air temperature sensor 5 with an estimated temperature of the piston 1.

The CPU 62 functions as the temperature estimation part 621 and the control part 622 by executing the program stored in the storage 61.

The temperature estimation part 621 acquires temperature data indicating the detected temperature from the oil temperature sensor 3, the water temperature sensor 4, and the intake air temperature sensor 5. The temperature estimation part 621 estimates the temperature of the piston 1 on the basis of acquired temperature data by referring to the temperature calculation table stored in the storage 61, for example. The temperature estimation part 621 estimates the temperature of the piston 1 on the basis of at least any of the temperature of cooling oil for cooling the piston 1, the temperature of the cooling water for cooling the engine, or the temperature of the intake air of the engine.

The temperature of the piston 1 has a greater correlation with the temperature of the cooling oil than with the temperature of the cooling water and the temperature of the intake air. Accordingly, the temperature estimation part 621 estimates the temperature of the piston 1 on the basis of the temperature of the cooling oil if the temperature of the cooling oil can be normally detected. The temperature estimation part 621 estimates the temperature of the piston 1 on the basis of at least any of the temperature of the cooling water or the temperature of the intake air, if the temperature of the cooling oil cannot be detected or the temperature of the cooling oil is determined to be outside a range of appropriate values. The temperature estimation part 621 informs the control part 622 of the estimated temperature.

The control part 622 controls a timing, at which the fuel injector 2 injects fuel, and an amount of fuel to be injected by the fuel injector 2. For example, the control part 622 periodically transmits control data indicating the timing of fuel injection and the amount of fuel to be injected, thereby varying the timing at which the fuel injector 2 injects fuel, and the amount of fuel to be injected by the fuel injector 2.

When the temperature of the piston 1 estimated by the temperature estimation part 621 rises to a first threshold value corresponding to a heat-resistance temperature of the piston 1, the control part 622 reduces an upper limit value of the timing of fuel injection at which the fuel injector 2 injects fuel. Further, when the rise in the temperature of the piston 1 stops, the control part 622 increases the upper limit value of the timing of fuel injection at a temperature higher than the first threshold value. The first threshold value is a temperature lower than the heat-resistance temperature at which the piston 1 is considered not to fail.

The upper limit value of the timing of fuel injection corresponds to the maximum value allowed as the angle of the gear connected to the piston 1 at its most advanced angle. The upper limit value of the timing of fuel injection when the temperature of the piston 1 is below the first threshold value is the angle of the gear at the top dead center of the piston 1, for example. When the temperature of the piston 1 rises to the first threshold value, the control part 622 reduces the upper limit value of the timing of fuel injection so that the angle of the gear is retarded with respect to the angle of the gear at the top dead center of the piston 1.

Figure 2:
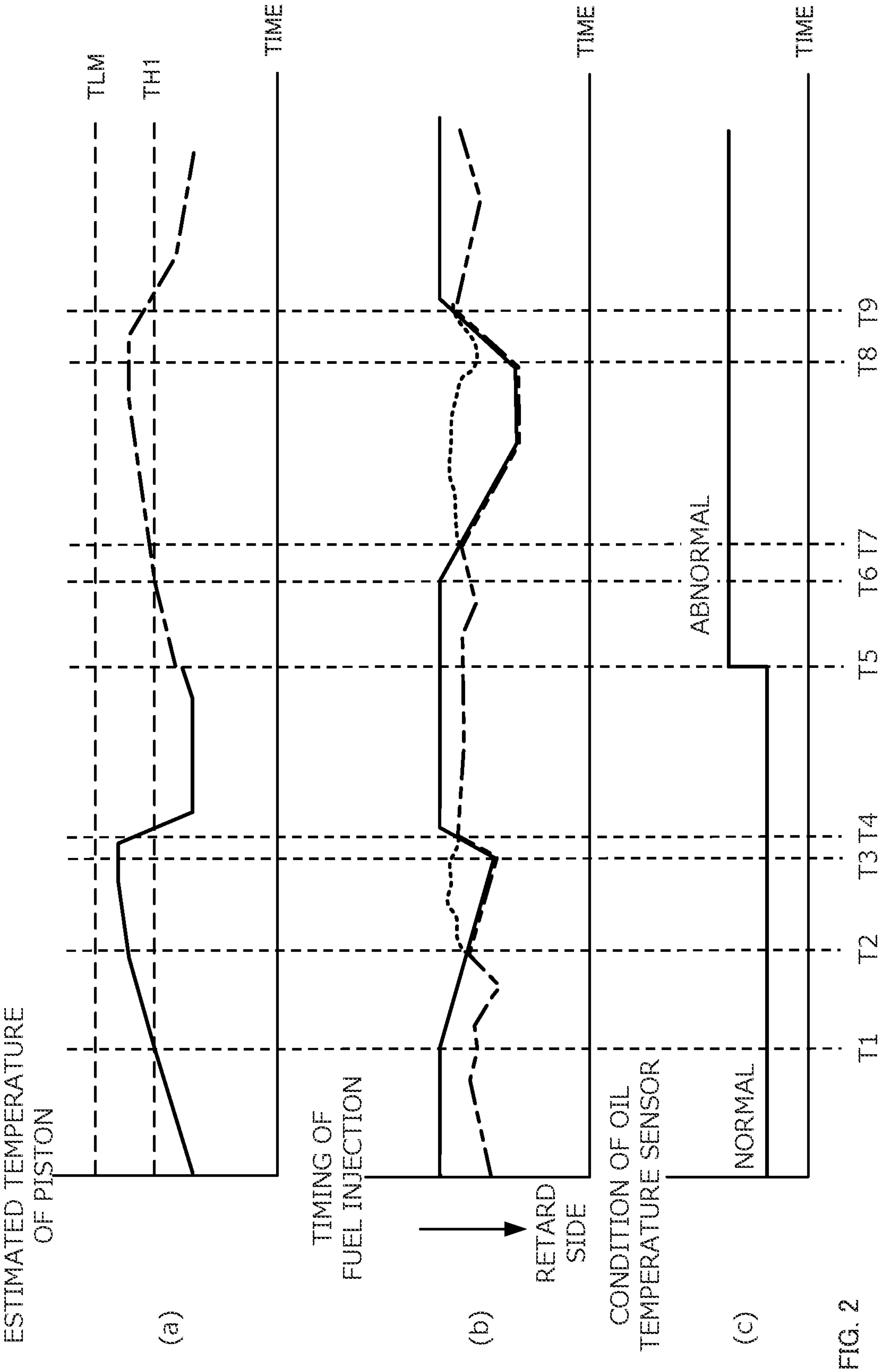
FIG. 2 illustrates an operation of a control part 622.

FIG. 2 illustrates an operation of the control part 622. In FIG. 2, the horizontal axis represents time. The vertical axis of the graph (a) in FIG. 2 represents the temperature of the piston 1 estimated by the temperature estimation part 621. TH1 denotes the first threshold value, and TLM denotes the heat-resistance temperature of the piston 1. In the graph (a) in FIG. 2, the estimated temperature of the piston 1 rises before a time T1, and the estimated temperature of the piston 1 is equal to or higher than the first threshold value (TH1) at the time T1.

The vertical axis of the graph (b) in FIG. 2 represents the angle of the gear corresponding to the upper limit value of the timing of fuel injection determined by the control part 622, an upper side of the graph represents an advance side where the timing of fuel injection is advanced, and a lower side of the graph represents a retard side where the timing of fuel injection is retarded. In the graph (b) in FIG. 2, a solid line represents the upper limit value of the timing of fuel injection determined by the control part 622, and a two-dot chain line represents a timing at which the fuel injector 2 injected fuel. A dotted line between a time T2 and a time T4 in the graph (b) in FIG. 2 represents a timing at which the fuel injector 2 injects fuel, if the estimated temperature of the piston 1 is not equal to or higher than the first threshold value.

As represented by the solid line in the graph (b) in FIG. 2, as the estimated temperature of the piston 1 becomes equal to or higher than the first threshold value at the time T1, the control part 622 reduces the upper limit value of the timing of fuel injection to the retard side. As a result, between the time T2 and the time T4, the fuel injector 2 injects fuel at the upper limit value more retarded than a normal timing of fuel injection represented by the dotted line. A retarded timing of fuel injection reduces time during which the piston 1 is subjected to combustion pressure of the fuel, thereby suppressing a rise in the temperature of the piston 1.

A rising rate of the estimated temperature of the piston 1 decreases from the time T1 to the time T3, and the rise in the estimated temperature of the piston 1 stops at the time T3. In the case of the example shown in the graph (b) of FIG. 2, after the rise in the estimated temperature of the piston 1 stops, the control part 622 increases the upper limit value of the timing of fuel injection to the advance side, after a period of time determined on the basis of a magnitude of an error in the estimated temperature has elapsed. As a result, at the time T4, the upper limit value of the timing of fuel injection coincides with a timing of fuel injection in a normal operation represented by the dotted line in the graph (b) of FIG. 2, and from the time T4 onwards, the fuel injector 2 injects fuel at a timing more retarded than the upper limit value of the timing of fuel injection.

The temperature estimation part 621 increases the upper limit value of the timing of fuel injection in a state where the estimated temperature of the piston 1 is higher than the first threshold value, thereby preventing the temperature of exhaust gas from rising due to the fuel injector 2 injecting fuel for too long in the retard state. Further, the temperature estimation part 621 increases a rate of change of the upper limit value of the timing of fuel injection during an increase in the upper limit value of the timing of fuel injection, compared to the rate of change of the upper limit value of the timing of fuel injection during a reduction in the upper limit value of the timing of fuel injection. The temperature estimation part 621 operates in this manner so that the upper limit value returns to normal in a short time, thereby further reducing a period during which the temperature of exhaust gas rises.

It should be noted that, in the example shown in the graph (c) of FIG. 2, an abnormality occurs in the oil temperature sensor 3 at a time T5. In such a case, the control part 622 determines the upper limit value of the timing of fuel injection on the basis of the temperature of the piston 1, which is estimated by the temperature estimation part 621 on the basis of at least any of the temperature of the cooling water or the temperature of the intake air. In the graph (a) of FIG. 2, the estimated temperature of the piston 1 after the time T5 switches to a temperature estimated on the basis of the temperature detected by the water temperature sensor 4, which is represented by a single dotted line.

The control part 622 reduces the upper limit value of the timing of fuel injection as the estimated temperature of the piston 1 reaches the first threshold at a time T6, and increases the upper limit value at a time T8 at which the rise in the estimated temperature of the piston 1 stops. Between the time T6 and a time T9, the fuel injector 2 injects fuel at the upper limit value of the timing of fuel injection determined by the control part 622, which is smaller than that of the timing of fuel injection when the estimated temperature of the piston 1 is below the first threshold value.

It should be noted that the control part 622 may determine an amount of the upper limit value of the timing of fuel injection to be made smaller on the basis of the rising rate of the temperature of the piston 1 estimated by the temperature estimation part 621. Further, the control part 622 may determine a reduction speed of the upper limit value of the timing of fuel injection (that is, a reduction rate which is an amount of reduction in unit time) on the basis of the rising rate of the temperature of the piston 1 estimated by the temperature estimation part 621. Specifically, as the rising rate of the temperature of the piston 1 is greater, the control part 622 increases the amount of reduction in the upper limit value of the timing of fuel injection or increases a rate of change of reduction of the upper limit value. The control part 622 operates in this manner, and so the temperature of the piston 1 can be quickly reduced when the temperature of the piston 1 is rising rapidly.

It is assumed that there is a case where the temperature of the piston 1 does not decrease even when the control part 622 reduces the upper limit value of a timing of fuel combustion. Accordingly, the control part 622 may reduce the upper limit value of the amount of fuel to be injected if the temperature of the piston 1 estimated by the temperature estimation part 621 rises to a second threshold value, which is greater than the first threshold value, after reducing the upper limit value of the timing of fuel injection. The temperature of the piston 1 decreases as the amount of fuel to be injected is reduced.

However, there is a possibility that a driver of the vehicle S feels discomfort when the amount of fuel to be injected is rapidly reduced. Accordingly, the control part 622 may reduce the upper limit value of an output torque of the vehicle S to reduce the upper limit value of the amount of fuel to be injected when the temperature of the piston 1 rises to the second threshold value.

Specifically, the control part 622 reduces the amount of fuel to be injected or the upper limit value of the amount of fuel to be injected by referring to control data that associates i) a torque target value used for reducing the torque target value of the vehicle S with ii) the amount of fuel to be injected. If the amount of fuel to be injected is indicated in the control data so that the driver does not feel any discomfort when the output torque is reduced, the control part 622 can decrease the temperature of the piston 1 by reducing the amount of fuel to be injected using the target value of output torque, without causing discomfort to the driver.

Figure 3:
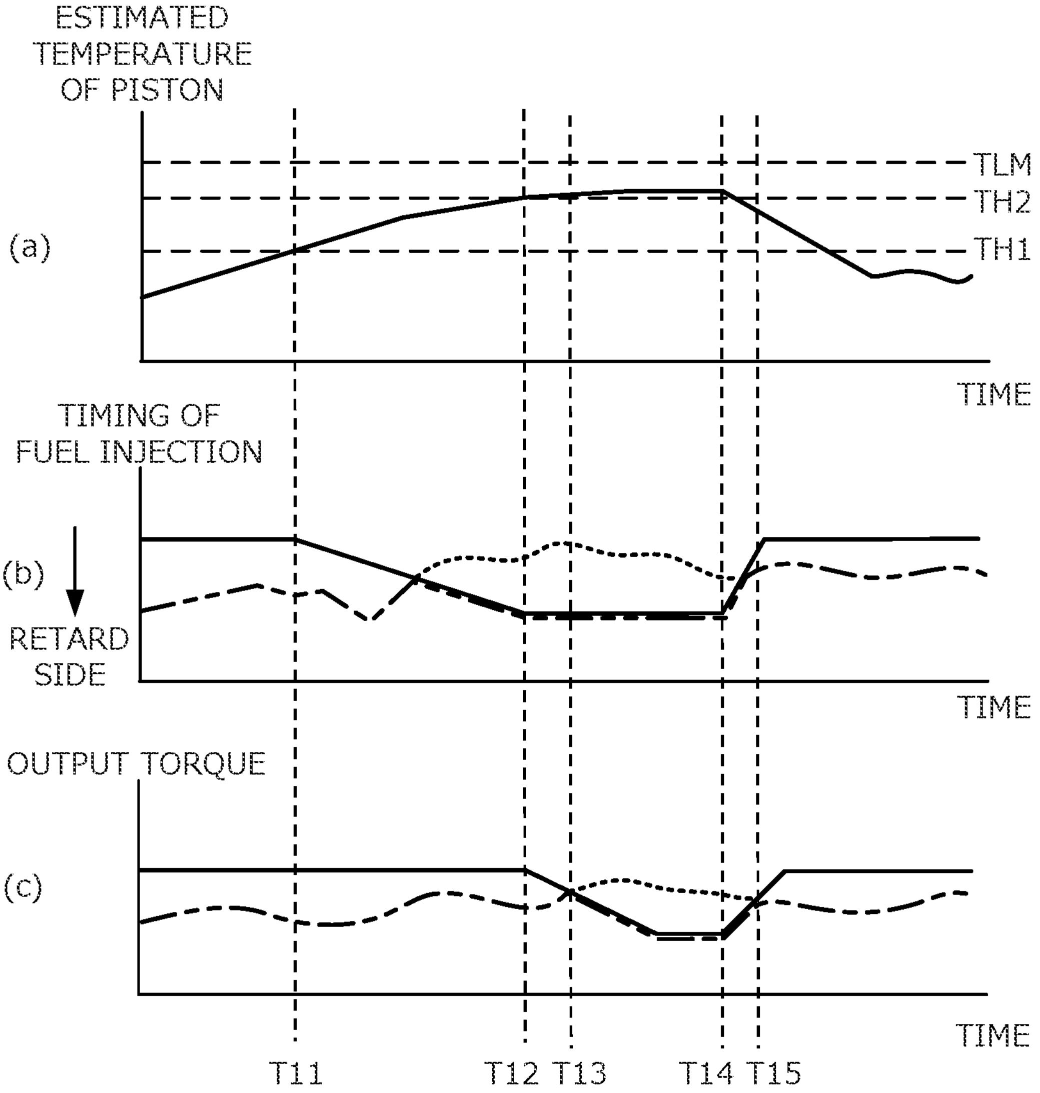
FIG. 3 illustrates an operation in which a temperature estimation part 621 controls an amount of fuel to be injected.

FIG. 3 illustrates an operation in which the temperature estimation part 621 controls the amount of fuel to be injected. In FIG. 3, the horizontal axis represents the time. The vertical axis in the graph (a) of FIG. 3 represents the estimated temperature of the piston 1, the vertical axis in the graph (b) of FIG. 3 represents the timing of fuel injection, and the vertical axis in the graph (c) of FIG. 3 represents the output torque of the vehicle S.

A solid line in the graph (b) of FIG. 3 represents the upper limit value of the timing of fuel injection, and a two-dot chain line represents the timing at which the fuel injector 2 injected fuel. A dotted line represents a timing at which the fuel injector 2 injects fuel, if the estimated temperature of the piston 1 is not equal to or higher than the first threshold value and the control part 622 does not reduce the upper limit value of the timing of fuel injection.

In the graph (c) of FIG. 3, a solid line represents the upper limit value of the output torque, and a two-dot chain line represents the output torque of the vehicle S. A dotted line represents the output torque in a state where the estimated temperature of the piston 1 is not equal to or higher than the second threshold value and the control part 622 does not reduce the upper limit value of the output torque (that is, in the normal state).

As the estimated temperature of the piston 1 reaches the first threshold value at a time T11 as in FIG. 2, the control part 622 reduces the upper limit value of the timing of fuel injection. However, as the estimated temperature of the piston 1 reaches the second threshold value (TH2) at a time T12, the control part 622 reduces the upper limit value of the output torque, so that the output torque between a time T13 and a time T15 is smaller than that in a normal state and equal to the upper limit value of the output torque. As a result, the estimated temperature of the piston 1 starts to decrease at a time T14, and the control part 622 increases the upper limit value of the output torque. Further, as shown in the graph (b) of FIG. 3, the control part 622 also increases the upper limit value of the timing of fuel injection at the time T14.

It should be noted that, in the above description, the control part 622 reduces the upper limit value of the output torque of the vehicle S when the estimated temperature of the piston 1 rises to the second threshold value, but the control part 622 may reduce the upper limit value of the output torque of the vehicle S to reduce the upper limit value of the amount of fuel to be injected when the estimated temperature of the piston 1 rises to the first threshold value. That is, the control part 622 may reduce the upper limit value of the timing of fuel injection and also reduce the upper limit value of the output torque when the estimated temperature of the piston 1 rises to the first threshold value. The control part 622 operates in this manner, thereby preventing the temperature of exhaust gas from rising too high.

Further, the control part 622 may reduce the upper limit value of the output torque when the estimated temperature of the piston 1 rises to the first threshold value, and may then reduce the upper limit value of the timing of fuel injection when the estimated temperature of the piston 1 rises to the second threshold value.

[Processing in Control Device 6]

Figure 4:
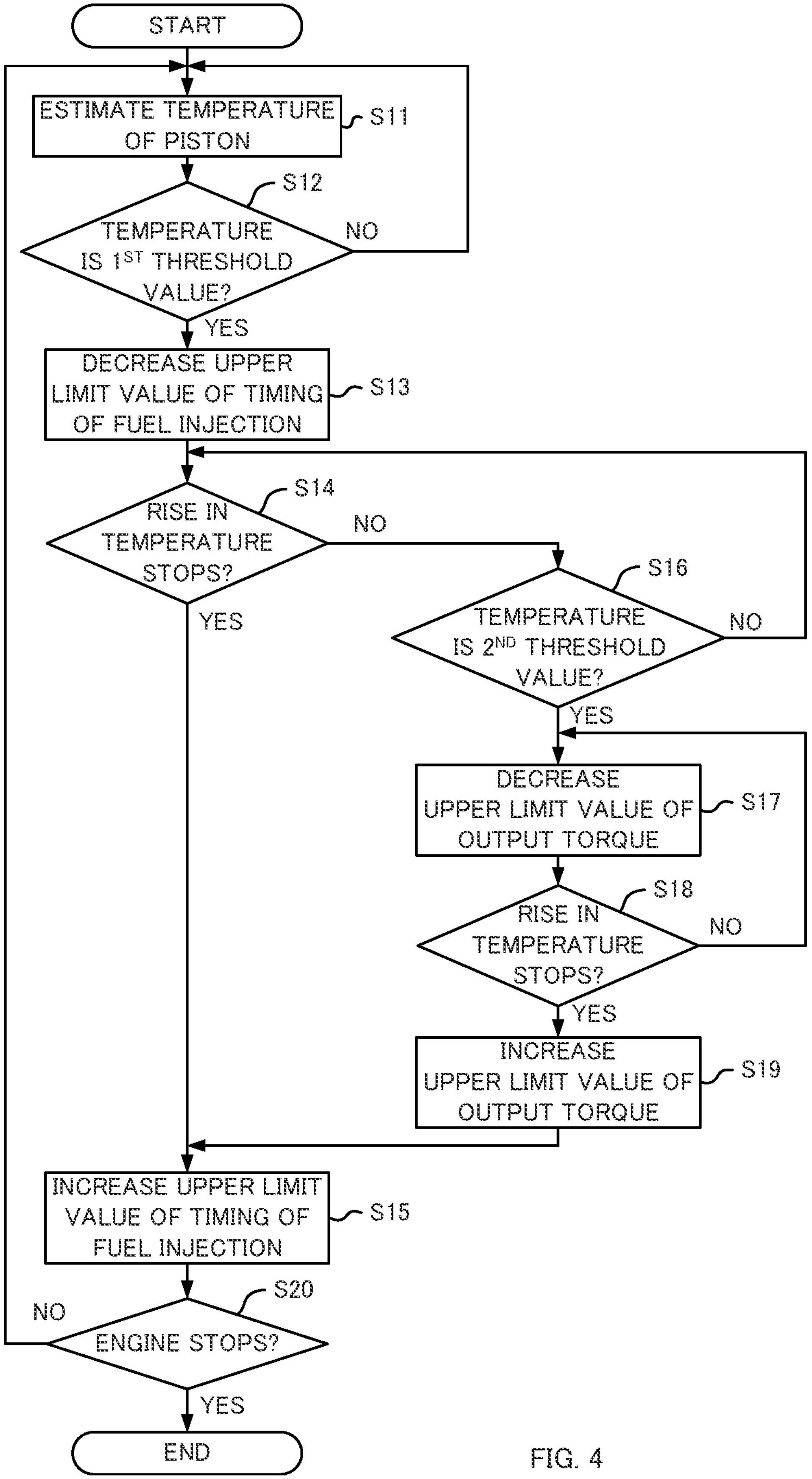
FIG. 4 is a flowchart showing processing in a control device 6.

FIG. 4 is a flowchart showing processing in the control device 6. The flowchart shown in FIG. 4 starts when the engine of the vehicle S is started.

The temperature estimation part 621 estimates the temperature of the piston 1 on the basis of the temperature data inputted from the oil temperature sensor 3, the water temperature sensor 4, or the intake air temperature sensor 5 (S11). If it is determined that the temperature estimated by the temperature estimation part 621 has reached the first threshold value (YES in S12), the control part 622 reduces the upper limit value of the timing of fuel injection (S13). If the temperature estimated by the temperature estimation part 621 is less than the first threshold value (NO in S12), the control part 622 returns the processing to S11 without reducing the upper limit value of the timing of fuel injection.

After that, if the rise in the temperature of the piston 1 is determined to have stopped (YES in S14), the control part 622 increases the upper limit value of the timing of fuel injection (S15). On the other hand, if it is determined that the rise in the temperature of the piston 1 has not stopped and the temperature of the piston 1 has reached the second threshold value (YES in S16), the control part 622 reduces the upper limit value of the output torque of the vehicle S (S17). If it is determined that the temperature of the piston 1 has not reached the second threshold value (NO in S16), the control part 622 returns the processing to S14.

After that, if the rise in the temperature of the piston 1 is determined to have stopped (YES in S18), the control part 622 increases the upper limit value of the output torque (S19) and also increases the upper limit value of the timing of fuel injection (S15). The CPU 62 repeats the processing from S11 to S19 until the engine is determined to have stopped (NO in S20).

[Effects of Control Device 6]

As described above, the control device 6 reduces the upper limit value of the timing of fuel injection, at which the fuel injector 2 injects fuel, when the temperature of the piston 1 estimated by the temperature estimation part 621 rises to the first threshold value corresponding to the heat-resistance temperature of the piston 1, and increases the upper limit value of the timing of fuel injection, at a temperature higher than the first threshold value, when the rise in the temperature of the piston 1 stops. The control device 6 is configured in such a way that i) the temperature of the piston 1 can be prevented from reaching the heat-resistance temperature when the temperature of the piston 1 approaches the heat-resistance temperature and ii) the timing of fuel injection can be quickly returned to the normal if the temperature of the piston 1 does not reach the heat-resistance temperature, thereby preventing the temperature of exhaust gas from rising too high while preventing the piston from overheating.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

1: piston
2: fuel injector
3: oil temperature sensor
4: water temperature sensor
5: intake air temperature sensor
6: control device
61: storage
62: CPU
621: temperature estimation part
622: control part

The invention claimed is:

1. A control device comprising:

a temperature estimation part that estimates a temperature of a piston of an internal combustion engine on the basis of at least any of a temperature of cooling oil for cooling the piston of the internal combustion engine of a vehicle, a temperature of cooling water for cooling the internal combustion engine, or an intake air temperature of the internal combustion engine; and a control part that i) reduces an upper limit value of a timing of fuel injection, at which a fuel injection part that injects fuel into the piston injects the fuel, when the temperature of the piston estimated by the temperature estimation part rises to a first threshold value corresponding to a heat-resistance temperature of the piston and ii) increases the upper limit value of the timing of fuel injection, at a temperature higher than the first threshold value, when the temperature of the piston stops rising.

2. The control device according to claim 1, wherein the control part increases a rate of change of the upper limit value of the timing of fuel injection during an increase in the upper limit value of the timing of fuel injection, compared to a rate of change of the upper limit value of the timing of fuel injection during a reduction in the upper limit value of the timing of fuel injection.

3. The control device according to claim 1, wherein the control part determines an amount of reduction in the upper limit value of the timing of fuel injection on the basis of a rising rate of the temperature of the piston estimated by the temperature estimation part.

4. The control device according to claim 3, wherein the control part increases the amount of reduction in the upper limit value of the timing of fuel injection as the rising rate is greater.

5. The control device according to claim 3, wherein the control part increases a rate of change of reduction in the upper limit value of the timing of fuel injection as the rising rate is greater.

6. The control device according to claim 1, wherein the control part determines a reduction speed of the upper limit value of the timing of fuel injection on the basis of a rising rate of the temperature of the piston estimated by the temperature estimation part.

7. The control device according to claim 1, wherein the control part reduces an upper limit value of an amount of fuel to be injected when the temperature of the piston estimated by the temperature estimation part rises to a second threshold value greater than the first threshold value, after reducing the upper limit value of the timing of fuel injection.

8. The control device according to claim 7, wherein the control part reduces the upper limit value of the amount of fuel to be injected by reducing an upper limit value of an output torque of the vehicle when the temperature of the piston rises to the second threshold value.

9. The control device according to claim 8, wherein the control part reduces the upper limit value of the amount of fuel to be injected by referring to control data that associates a target value of the output torque of the vehicle and the amount of fuel to be injected, the control data being used for reducing the target value of the output torque of the vehicle.

10. The control device according to claim 1, wherein the control part reduces an upper limit value of an output torque of the vehicle when the temperature of the piston rises to the first threshold value.

11. The control device according to claim 1, wherein the temperature estimation part estimates the temperature of the piston on the basis of at least any of the temperature of the cooling water or the temperature of the intake air if the temperature of the cooling oil cannot be detected.

12. The control device according to claim 1, wherein the control part increases the upper limit value of the timing of fuel injection to an advance side after a period of time determined on the basis of a magnitude of an error in the temperature of the piston estimated by the temperature estimation part has elapsed after the temperature of the piston estimated by the temperature estimation part stops rising.

* * * * *